(12) United States Patent
Bradfield

(10) Patent No.: US 10,005,359 B2
(45) Date of Patent: Jun. 26, 2018

(54) MANUAL TRANSMISSION DRIVING ASSISTANT

(71) Applicant: Ford Global Technologies, LLC, Dearborn, MI (US)

(72) Inventor: Donald Edward Bradfield, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/257,257

(22) Filed: Sep. 6, 2016

(65) Prior Publication Data

US 2018/0065480 A1    Mar. 8, 2018

(51) Int. Cl.
*B60K 26/02*    (2006.01)

(52) U.S. Cl.
CPC ...... *B60K 26/021* (2013.01); *B60K 2026/022* (2013.01); *B60Y 2300/18025* (2013.01)

(58) Field of Classification Search
CPC .................................................. B60K 26/021
See application file for complete search history.

(56) References Cited

U.S. PATENT DOCUMENTS

| | | |
|---|---|---|
| 5,080,207 A | 1/1992 | Horneffer |
| 2003/0130091 A1 | 7/2003 | Wafzig |
| 2015/0198235 A1 | 7/2015 | Baumgartner |
| 2016/0327151 A1 * | 11/2016 | Backes ............... F16H 61/0213 |

* cited by examiner

*Primary Examiner* — Basil T. Jos
(74) *Attorney, Agent, or Firm* — James Dottavio; Brooks Kushman P.C.

(57) ABSTRACT

A vehicle with a manual transmission includes vibration devices on the clutch pedal and the accelerator pedal. To assist the driver, a controller activates these vibration devices when the corresponding pedal should be further released. Criteria are described for determining whether one of the pedals should be further released during various maneuvers such as vehicle launch, and gear changes.

20 Claims, 6 Drawing Sheets

FIG. 1 - PRIOR ART

MANUAL TRANSMISSION DRIVING ASSISTANT

TECHNICAL FIELD

This disclosure relates to the field of transmission systems. More particularly, the disclosure pertains to a system to assist a driver.

BACKGROUND

A typical manual powertrain is illustrated in FIG. 1. Solid lines represent mechanical power flow through rotating shafts. Dashed lines represent control connections, which may be implemented using mechanical linkages. Engine 10 generates power at crankshaft 12 by burning fuel. The engine responds to changes in the position of accelerator pedal 14 to generate more power when the pedal is depressed further by the driver. Transmission 16 transmits power from crankshaft 12 to output shaft 18. Transmission 16 includes a friction clutch 20 and a gearbox 22 connected by input shaft 24. Gearbox 22 is capable of establishing a variety of forward speed ratios and at least one reverse speed ratio in response to driver manipulation of shifter 26. The driver controls the torque capacity of clutch 20 by manipulation of clutch pedal 28. Conventionally, the torque capacity of clutch 20 is negligible when clutch pedal 28 is fully depressed and is at a maximum when clutch pedal 28 is fully released. Differential 30 splits power from output shaft 18 between a left half-shaft 32 driving a left wheel 34 and a right half-shaft 36 driving a right wheel 38 while permitting slight speed differences between the wheels as the vehicle turns a corner. In a typical rear wheel drive powertrain, the transmission output shaft is a driveshaft that extends to the differential. In a typical front wheel drive powertrain, the output shaft 16 may be driveably connected to the differential by a final drive gear. The transmission and differential of a front wheel drive powertrain are frequently combined into a single housing and called a transaxle.

For internal combustion engine 10 to generate power, crankshaft 12 must rotate at sufficient speed. However, when the vehicle is stationary with gearbox 22 establishing a speed ratio, input shaft 24 is also stationary. In order to start the vehicle moving, the driver controls the torque capacity of clutch 20 to transmit power from moving crankshaft 12 to stationary input shaft 24. As the vehicle accelerates, the speed of input shaft 24 gradually increases until it is equal to the speed of crankshaft 12, at which point clutch 20 can be fully engaged. With clutch 20 fully engaged, the speed of crankshaft 12 is proportional to vehicle speed. As the vehicle accelerates in 1st gear, the speed of crankshaft 12 becomes excessive, necessitating a shift to 2nd gear. Similarly, upshifts are required when the crankshaft speed becomes excessive in any of the other gears. Downshifts are required whenever the crankshaft speed becomes too low. Gearbox 22 is not capable of changing ratios while transmitting power. Therefore, the driver shifts by disengaging clutch 20, then manipulating shifter 26 to change the gearbox ratio, then re-engaging clutch 20. Re-engagement of clutch 20 forces the crankshaft speed to become equal to input shaft speed, predominantly by changing the speed of the crankshaft.

During a launch event, the driver must coordinate the movement of clutch pedal 28 and accelerator pedal 14. The acceleration rate during a launch is proportional to the clutch torque capacity. To launch with a desired acceleration rate, the driver must position the clutch pedal to the position corresponding to the desired clutch torque capacity. If the pedal is depressed too far, the clutch torque capacity is less than desired and the vehicle accelerates too slowly, and may even roll backwards if it is facing uphill. If the clutch pedal is not depressed far enough, the torque capacity is higher than desired resulting in more vehicle acceleration than desired. If the accelerator pedal 14 is pressed too much relative to the actual depression of clutch pedal 28, the engine will accelerate. If this goes unchecked, the engine speed will become excessive, resulting in a drawn out launch event with excessive energy dissipation in the clutch. If accelerator pedal is not depressed far enough relative to the actual depression of clutch pedal 28, the engine speed will decrease which can result in an engine stall.

Many new drivers of manual transmissions have difficulty manipulating the clutch pedal and accelerator pedal properly during a vehicle launch. Similarly, drivers with poor hearing may have difficulty due to the lack of audible feedback regarding engine noise. This difficulty is exacerbated by the non-linear relationship between clutch pedal position and torque capacity. As the driver releases the clutch pedal from a fully depressed position, the torque capacity remains at near zero until the pedal reaches a point called the touch point. Then, as the driver further releases the pedal, the torque capacity increases reaching full capacity before the clutch pedal is fully released. New drivers often have difficulty finding the touch point. If the driver errs on the side of depressing the pedal too far, then the vehicle does not accelerate and the engine may race due to the engine torque exceeding the clutch torque capacity. If the driver errs on the side of releasing the pedal too far, the torque capacity is excessive causing a jerky launch or stalling the engine.

Furthermore, the pedals must also be coordinated when completing a gear shift. To re-establish positive torque after a gear shift, the crankshaft speed should slightly exceed the input shaft speed when the clutch pedal is released. After a downshift, the driver must increase the crankshaft speed using the accelerator pedal. After a downshift, the engine speed will decrease on its own, but may decrease to less than the input shaft speed if the gear shift takes too long. If the clutch is released when the crankshaft speed is less than the input shaft speed, the torque will be negative, causing the vehicle to decelerate. If the crankshaft speed exceeds the input shaft speed by too much, the re-engagement will likely be jerky.

SUMMARY OF THE DISCLOSURE

A vehicle includes a clutch pedal having a first vibration device, a manual transmission, and a controller. The manual transmission includes a clutch controlled by the clutch pedal. The controller is programmed to activate the first vibration device in response to a driver depressing the clutch pedal further than warranted by sensed conditions. A variety of sensed conditions may trigger activation of the first vibration device. The first vibration device may be activated in response to a vehicle speed being less than a launch threshold, selection of a launch gear ratio, and a clutch pedal position less than a clutch touch point. The first vibration device may be activated in response to a vehicle speed being less than a launch threshold, an engine speed exceeding an idle threshold, selection of a launch gear ratio, and an engine acceleration exceeding an acceleration threshold. The acceleration threshold may be a function of engine speed. The first vibration device may be activated in response to a vehicle speed being less than a launch threshold, an engine speed exceeding an idle threshold, selection of a launch gear ratio, and vehicle acceleration less than a function of engine speed and vehicle speed. The first vibration device may be activated in response to a vehicle speed being greater than a launch threshold and a difference between an engine speed and an input shaft speed being greater than zero and less than a slip threshold. The vehicle may also include an accelerator pedal having a second vibration device. The second vibration device may be activated in response to a vehicle speed being less than a launch threshold and an engine speed exceeding a speed threshold. The second vibration device may be activated in response to a vehicle speed being greater than a launch threshold and a difference between an engine speed and an input shaft speed being greater than a slip threshold.

A method of assisting a driver of a manual transmission vehicle includes vibrating a clutch pedal based on a difference between an engine speed and an input shaft speed. The difference is monitored while a clutch is disengaged following a gear ratio change. The clutch pedal is vibrated in response to the difference being greater than zero and less than a slip threshold. An accelerator pedal may be vibrated in response to the difference exceeding the slip threshold. During a launch event, the clutch pedal may be vibrated to indicate that the driver should at least partially release the clutch pedal. The need to at least partially release the clutch pedal may be determined by a clutch pedal position being less than a touchpoint. Alternatively or additionally, it may be determined by a vehicle acceleration rate being less than a function of vehicle speed and/or engine speed. Alternatively or additionally, it may be determined by an engine acceleration exceeding an acceleration threshold. During a launch event, the accelerator pedal may be vibrated in response to the engine speed exceeding a speed threshold.

A method of assisting a driver of a manual transmission vehicle includes vibrating a clutch pedal and vibrating an accelerator pedal. The clutch pedal is vibrated in response to first sensed conditions indicating that the clutch pedal should be at least partially released. For example, following a gear ratio change, the clutch pedal may be vibrated in response to a difference between an engine speed and an input shaft speed being greater than zero and less than a slip threshold. As another example, during a launch event, the clutch pedal may be vibrated in response to a clutch pedal position being less than a touchpoint. As another example, during a launch event, the clutch pedal may be vibrated in response to a clutch pedal position being less than a touchpoint. As another example, during a launch event, the clutch pedal may be vibrated in response to an engine acceleration exceeding an acceleration threshold. The accelerator pedal is vibrated in response to second sensed conditions indicating that the accelerator pedal should be at least partially released. For example, following a gear ratio change, the accelerator pedal may be vibrated in response to a difference between an engine speed and an input shaft speed being greater than a slip threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
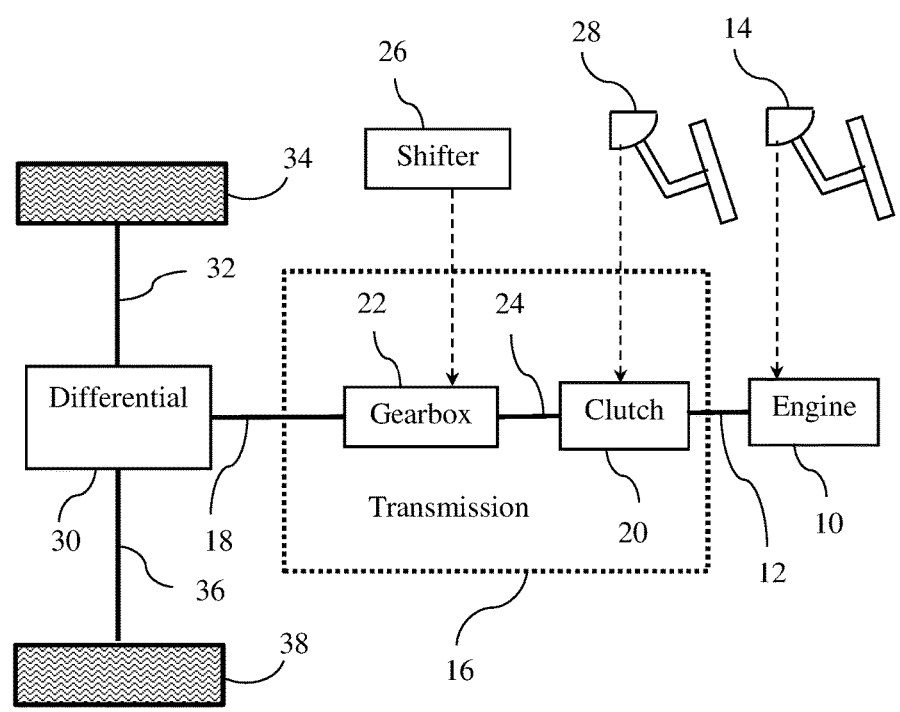
FIG. 1 is schematic illustration of a vehicle powertrain having a manual transmission.
Figure 2:
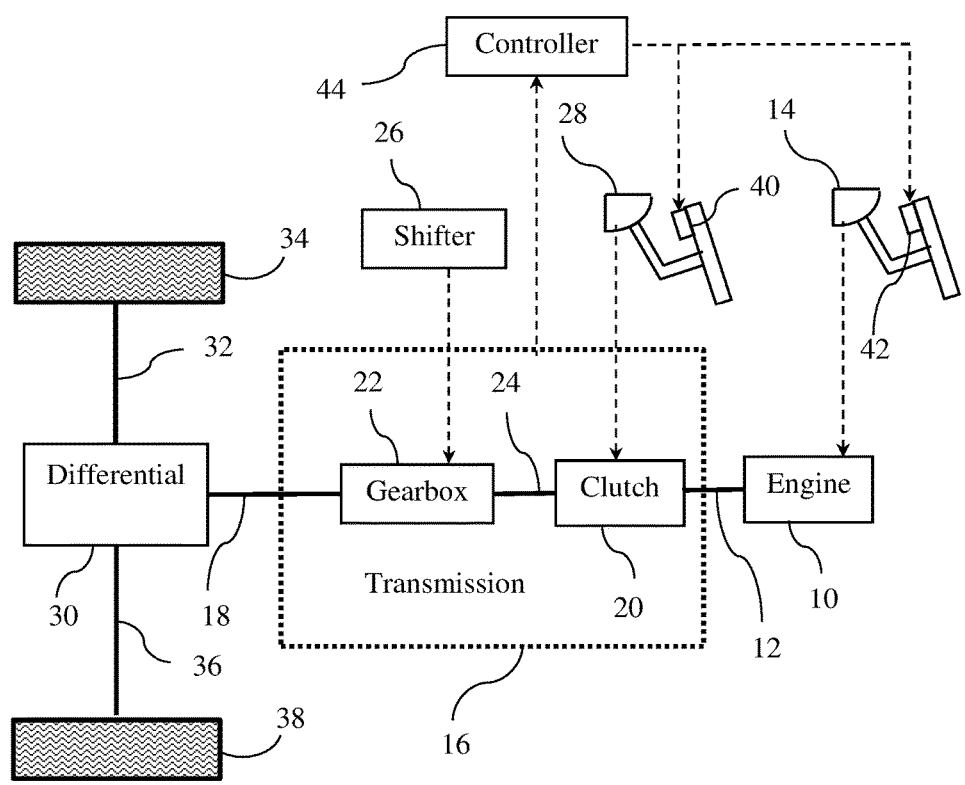
FIG. 2 is a schematic illustration of a vehicle powertrain having a manual transmission an a driver assistance system.

FIG. 2 illustrates a modified powertrain designed to assist a new manual transmission driver. A first vibration device 40 is installed on clutch pedal 28 and a second vibration device 42 is installed on accelerator pedal 14. If the driver has depressed either pedal too far for the current conditions, a controller 44 signals the respective vibration device causing it to vibrate. The driver can sense these vibrations through his or her feet. Controller 44 uses a variety of signals from sensors in the transmission 16 to determine when too activate each vibration device as discussed below.

Figure 3:
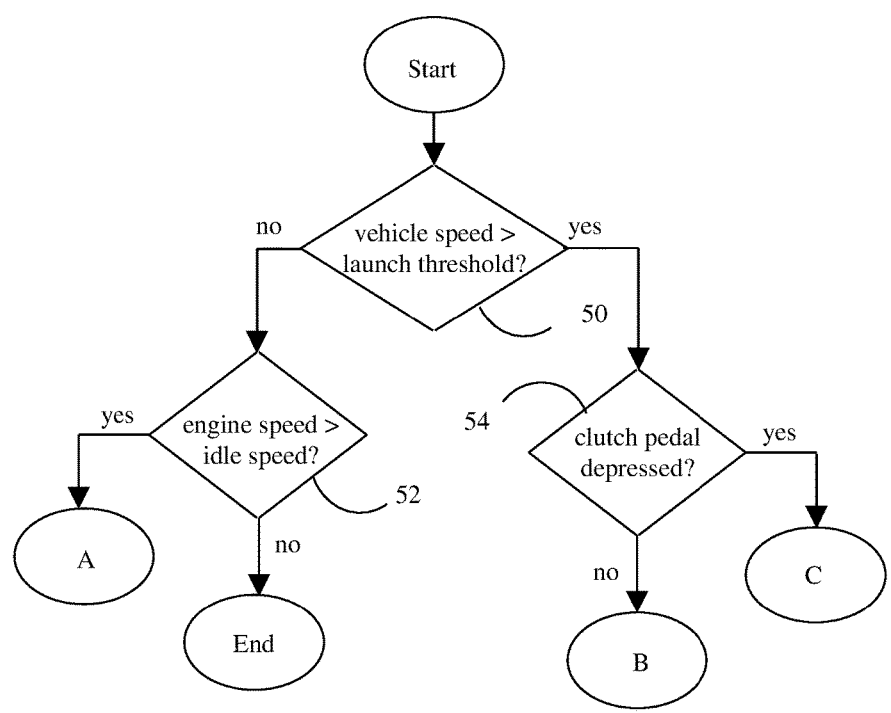
FIG. 3 is a flow chart for determining what type of maneuver, if any, is currently happening.

FIGS. 3-6 illustrate a process for determining whether to activate vibration devices 40 and 42. This process is executed by controller 44 at regular intervals, such as every 100 ms, while the vehicle is in operation. FIG. 3 illustrates the first step in this process—determining what maneuver is currently underway. At 50, the current vehicle speed is compared to a predetermined launch threshold which is approximately 5-10 mph. If the vehicle speed is less than the launch threshold, then the method determines that either a launch maneuver is in progress or the vehicle is idling. At 52, the current engine speed is compared to a maximum engine idle speed, such as 800 rpm. If the engine speed exceeds the idle speed, then the method concludes that a launch is underway and proceeds to location A in the flowchart of FIG. 4. Otherwise, the method concludes that the vehicle is idling and exits without activating either vibration device. If the vehicle speed exceeds the launch threshold at 50, the method proceeds to check whether the clutch pedal is at least partially depressed at 54. If the clutch pedal is fully released, the method concludes that no shift is in progress and proceeds to location B in the flowchart of FIG. 5. Otherwise, the method concludes that a shift is in progress and proceeds to location C in the flow chart of FIG. 6.

Figure 4:
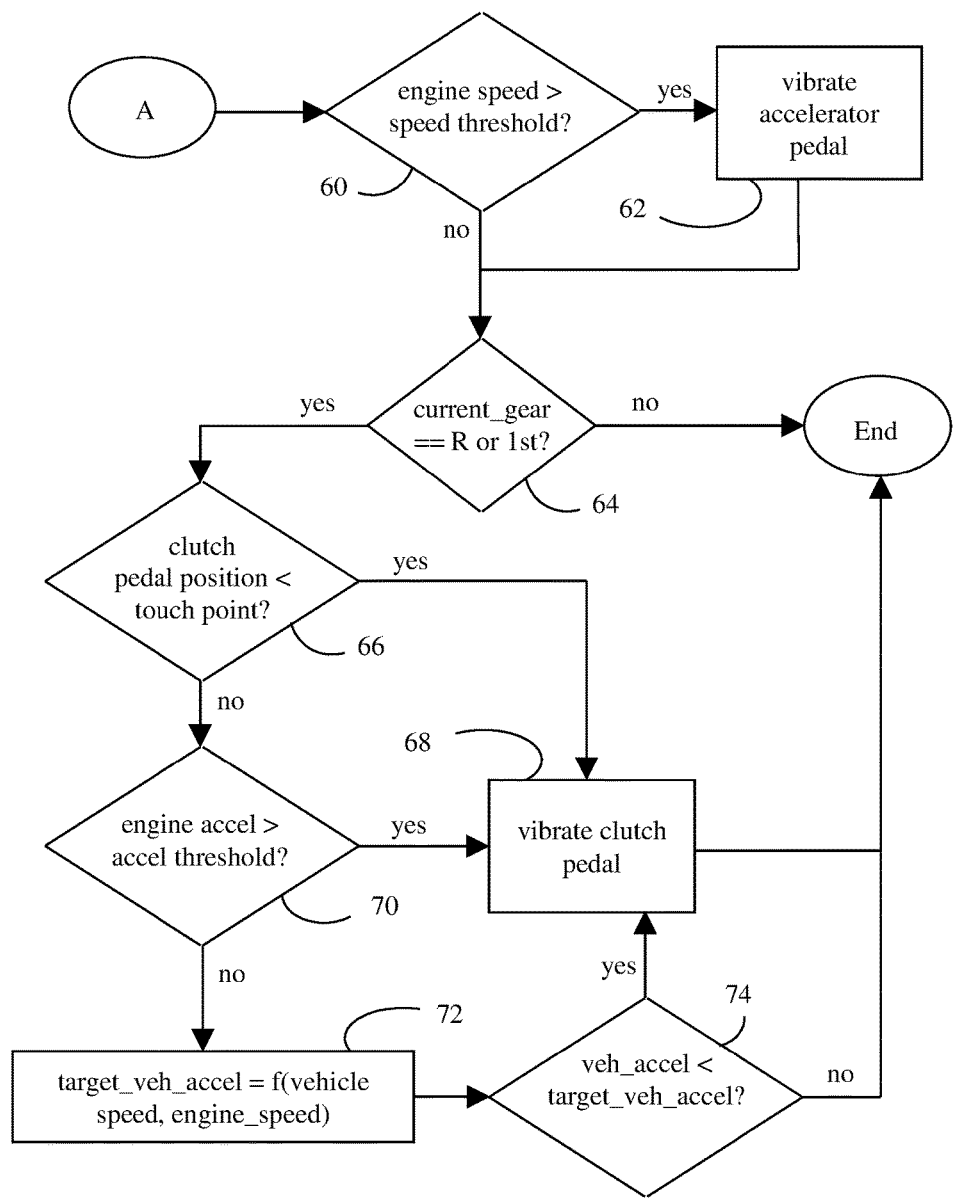
FIG. 4 is a flow chart for determining whether to vibrate the clutch pedal, the accelerator pedal, or neither during a launch maneuver.

FIG. 4 illustrates a process for vibrating the clutch or accelerator pedal during a launch maneuver. At 60, the method determines whether the engine crankshaft speed exceeds a speed threshold, such as 3000 rpm. If so, the method activates accelerator pedal vibration device 42 at 62, indicating to the driver that he or she should reduce the accelerator pedal depression. At 64, the method determines whether a launch gear such as Reverse of 1st gear is currently selected. If not, the method exits without activating clutch pedal vibration device 40. If a launch gear is selected, the method checks at 66 whether the clutch pedal is less than the touchpoint. For this purpose, clutch pedal position is assumed to be a value that increases as the clutch pedal is released. The controller may determine this, for example, based on a pedal position sensor and data from previous launches or based on a sensor that detects clutch torque capacity. If the clutch pedal is depressed beyond the touchpoint, clutch pedal vibration device 40 is activated at 68 and then the method exits. At 70 the method checks whether the current engine acceleration is greater than an acceleration threshold. This would indicate that clutch torque capacity is too low relative to the engine torque and the engine speed will soon be excessive. The acceleration threshold may be a constant or may be a function of the current engine speed. If so, clutch pedal vibration device 40 is activated at 68 and then the method exits. At 72, the method determines a target vehicle acceleration based on the current vehicle speed and the current engine speed. This relationship may be stored, for example, as a table that is populated during vehicle calibration. If the actual vehicle acceleration is less than the target vehicle acceleration at 74, then the clutch pedal vibration device is activated at 68 before exiting. In alternative embodiments, the controller may calculate a target clutch pedal position at 72 and compare it to a measured clutch pedal position at 74. Although several criteria are listed in this flowchart for determining whether the clutch pedal is excessively depressed during a launch maneuver, some embodiments may omit some of these criteria and/or include additional criteria.

Figure 5:
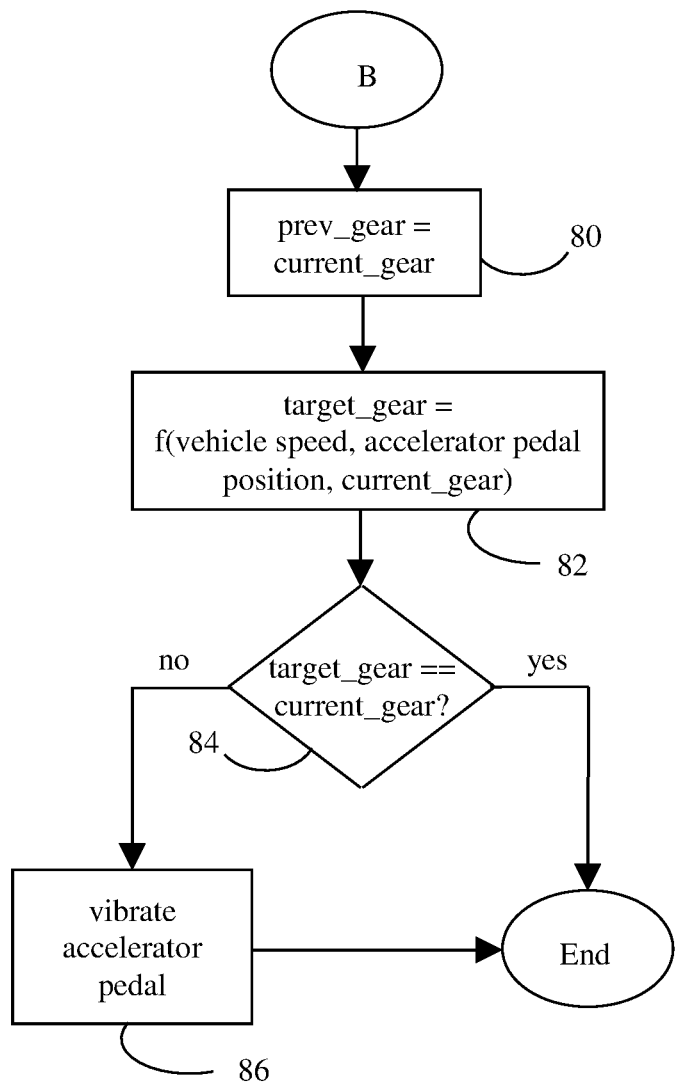
FIG. 5 is a flow chart for determining whether or not to vibrate the accelerator pedal to indicate a need to shift.

FIG. 5 illustrates a process for vibrating the accelerator pedal to indicate when a shift should be initiated. At 80, a previous gear variable is set equal to the currently selected gear. This variable is used in the flow chart of FIG. 6. At 82, a target gear is calculated based on the current vehicle speed, the current accelerator pedal position, and the currently selected gear. This calculation may use similar logic to that used to select a transmission gear in an automatic transmission. If the current gear is the same as the target gear at 84, then the method exits without activating a vibration device. Otherwise, accelerator pedal vibration device 42 is activated to indicate to the driver that a shift should be initiated. Optionally, an up arrow or down arrow on the instrument panel may illuminate to indicate whether to upshift or downshift. Alternatively, the instrument panel may indicate the target gear.

Figure 6:
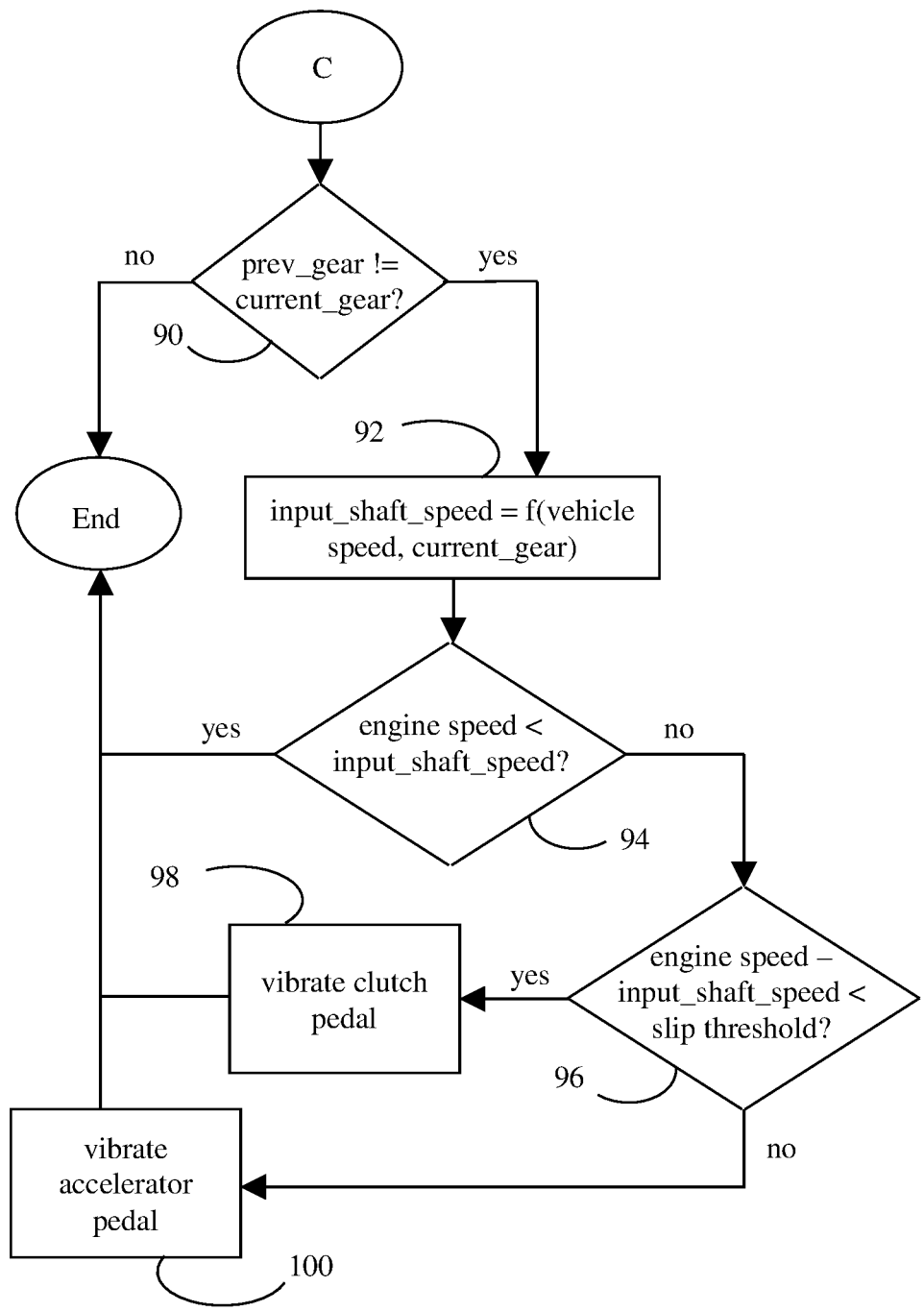
FIG. 6 is a flow chart for determining whether to vibrate the clutch pedal, the accelerator pedal, or neither during a shift.

FIG. 6 illustrates a process for assisting the driver during a re-engagement following a shift event. At 90, the process determines whether the currently selected gear is different from the previous gear as recorded at 80 during a previous execution of the process. If they are the same, the process exits without vibrating either pedal because the shift has not yet been completed and it is therefore premature to re-engage the clutch. At 92, the method calculates the input shaft speed based on the vehicle speed and the currently selected gear. Alternatively, the input shaft speed may be measured directly. If the engine speed is less than the input shaft speed at 94, the method exits without vibrating either pedal because it is impossible to re-engage with positive torque in this condition. At 96, the method determines whether the difference between the engine speed and the input shaft speed, called the slip speed, is less than a slip threshold. If so, the method activates clutch pedal vibration device 40 at 98 to indicate to the driver that conditions are appropriate to release the clutch pedal to re-engage. If not, meaning that the slip speed is more than the slip threshold, the method activates accelerator pedal vibration device 42 at 100 indicating to the driver that the accelerator pedal should be slightly released to reduce the engine speed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a clutch pedal having a first vibration device;
    a manual transmission including a clutch controlled by the clutch pedal; and
    a controller programmed to activate the first vibration device in response to a driver depressing the clutch pedal further than warranted by sensed conditions.

2. The vehicle of claim 1 wherein the sensed conditions comprise:
    a vehicle speed being less than a launch threshold;
    selection of a launch gear ratio; and
    a clutch pedal position less than a clutch touch point.

3. The vehicle of claim 1 wherein the sensed conditions comprise:
    a vehicle speed being less than a launch threshold;
    an engine speed exceeding an idle threshold;
    selection of a launch gear ratio; and
    an engine acceleration greater than an acceleration threshold.

4. The vehicle of claim 1 wherein the sensed conditions comprise:
    a vehicle speed being less than a launch threshold;
    an engine speed exceeding an idle threshold;
    selection of a launch gear ratio; and
    a vehicle acceleration rate less than a function of the vehicle speed and the engine speed.

5. The vehicle of claim 1 further comprising an accelerator pedal having a second vibration device and wherein the controller is further programmed to activate the second vibration device in response to
    a vehicle speed being less than a launch threshold; and
    an engine speed exceeding a speed threshold.

6. The vehicle of claim 1 wherein the sensed conditions comprise:
    a vehicle speed being greater than a launch threshold; and
    a difference between an engine speed and an input shaft speed being greater than zero and less than a slip threshold.

7. The vehicle of claim 6 further comprising an accelerator pedal having a second vibration device and wherein the controller is further programmed to activate the second vibration device in response to
the vehicle speed being greater than the launch threshold; and
the difference exceeding the slip threshold.

8. A method of assisting a driver of a manual transmission vehicle comprising:
while a clutch is disengaged following a gear ratio change, monitoring a difference between an engine speed and an input shaft speed; and
vibrating a clutch pedal in response to the difference being greater than zero and less than a slip threshold.

9. The method of claim 8 further comprising vibrating an accelerator pedal in response to the difference exceeding the slip threshold.

10. The method of claim 8 further comprising vibrating the clutch pedal during a vehicle launch to indicate that the driver should at least partially release the clutch pedal.

11. The method of claim 10 wherein the clutch pedal is vibrated in response to a clutch pedal position being less than a touchpoint.

12. The method of claim 10 wherein the clutch pedal is vibrated in response to a vehicle acceleration rate being less than a function of a vehicle speed and the engine speed.

13. The method of claim 10 wherein the clutch pedal is vibrated in response to an engine acceleration exceeding an acceleration threshold.

14. The method of claim 10 further comprising vibrating an accelerator pedal during the vehicle launch in response to the engine speed exceeding a speed threshold to indicate that the driver should at least partially release the accelerator pedal.

15. A method of assisting a driver of a manual transmission vehicle comprising:
vibrating a clutch pedal in response to first sensed conditions indicating that the clutch pedal should be at least partially released; and
vibrating an accelerator pedal in response to second sensed conditions indicating that the accelerator pedal should be at least partially released.

16. The method of claim 15 wherein the first sensed conditions comprise:
following a gear ratio change, a difference between an engine speed and an input shaft speed being greater than zero and less than a slip threshold.

17. The method of claim 16 wherein the first sensed conditions comprise:
following the gear ratio change, the difference exceeding the slip threshold.

18. The method of claim 15 wherein the first sensed conditions comprise:
during a launch event, a clutch pedal position being less than a touch point.

19. The method of claim 15 wherein the first sensed conditions comprise:
during a launch event, a vehicle acceleration rate being less than a function of a vehicle speed and an engine speed.

20. The method of claim 15 wherein the first sensed conditions comprise:
during a launch event, an engine acceleration exceeding an acceleration threshold.

* * * * *